United States Patent [19]

Farrington et al.

[11] 4,071,593

[45] Jan. 31, 1978

[54] PROCESS FOR MAKING A PITCH IMPREGNATED, COLD MOLDED REFRACTORY ARTICLE

[75] Inventors: Grant M. Farrington, Downingtown, Pa.; J. Donald Harris, Beamsville, Canada; Alfred H. Foessel, Baltimore, Md.

[73] Assignee: General Refractories Company, Bala Cynwyd, Pa.

[21] Appl. No.: 608,904

[22] Filed: Aug. 29, 1975

Related U.S. Application Data

[63] Continuation-in-part of Ser. No. 413,250, Nov. 6, 1973, Pat. No. 3,903,025.

[51] Int. Cl.$^2$ ............................................. C04B 35/84
[52] U.S. Cl. .................................... 264/62; 264/65; 264/101

[58] Field of Search .................. 264/60, 62, DIG. 20, 264/29, 65, 101

[56] References Cited

U.S. PATENT DOCUMENTS

| 3,236,664 | 2/1966 | Wilson | 106/56 |
| 3,261,896 | 7/1966 | Davies et al. | 264/65 |
| 3,333,033 | 7/1967 | Metz | 264/27 |
| 3,441,636 | 4/1969 | Wuhrer et al. | 264/65 |
| 3,483,012 | 12/1969 | Young | 264/62 |
| 3,903,025 | 9/1975 | Farrington et al. | 264/65 |

*Primary Examiner*—Donald J. Arnold
*Attorney, Agent, or Firm*—Brian G. Brunsvold; Herbert H. Mintz; Everett H. Murray, Jr.

[57] ABSTRACT

A process is described for making shaped refractories by impregnating cold pitch-bonded shaped refractories with a liquid composition comprising hot pitch.

8 Claims, No Drawings

PROCESS FOR MAKING A PITCH IMPREGNATED, COLD MOLDED REFRACTORY ARTICLE

This application is a continuation-in-part of copending application Ser. No. 413,250, filed Nov. 6, 1973, now U.S. Pat. No. 3,903,025, issued Sept. 2, 1975.

FIELD OF THE INVENTION

This invention relates to a process for making a shaped refractory article, especially brick. More particularly, the present invention pertains to a method for making refractory articles comprising impregnating cold pitch-bonded shaped refractory articles with a liquid binding composition, especially hot pitch.

BACKGROUND OF THE INVENTION

Refractory linings employed in basic oxygen process steel-making furnaces must have sufficient strength to support the charge of molten metal in the vessel. In addition, the lining must be resistant to erosion or abrasion caused by the molten metal and molten slag. The porosity of the coked refractory composition is important with respect to the useful life of the lining in the vessel; low porosity refractory linings are relatively impervious and thus the molten metal or molten slag do not readily penetrate the surface of the lining and erode the refractory.

In order to withstand the slagging conditions found in present-day basic oxygen steel furnaces, refractory linings must have a porosity after coking of less than 15% and preferably less than 13% (as determined by ASTM procedure C-607). It is also essential that the refractory shapes used for such linings remain strong from room temperature up to a temperature at which the carbonaceous bonding material begins to coke (approximately 850°–950° F). If a weakness occurs as a temperature below the temperature at which the coke begins to form, a soft zone will be created in the lining, resulting in spalling during initial heat-up of the vessel. After coking, the refractory shapes to be useful in basic oxygen furnaces, must have transverse strength of at least 500 psi.

The conventional method of producing shaped refractory articles for use as linings in basic oxygen blowing steelmaking vessels involves hot forming of pitch bonded refractory bricks. However, the hot forming process has many disadvantages, and the need has existed for a technique for producing pitch bonded refractory shapes which can be molded at room temperatures. In copending application Ser. No. 413,250, filed Nov. 6, 1973, by the present inventors, there is disclosed a pitch-containing binder composition and a method of preparing refractory shapes at room temperature utilizing the disclosed binder composition. As taught in said copending application Ser. No. 413,250, the entire disclosure of which is hereby expressly incorporated by reference, refractory shapes bonded with the binder composition disclosed therein have a porosity after coking of less than 15% and maintain high strength through all temperature ranges up to the operating temperature of basic oxygen process steel furnaces.

While the compositions and processes disclosed in Ser. No. 413,250 represent significant improvements in the art, it has now been found that further improvements and advantages can unexpectedly be realized if the cold pitch bonded shaped refractory articles made in accordance with the teachings of application Ser. No. 413,250 are subjected to impregnation with a second binder composition, preferably a hot liquid pitch-containing binder composition. It has been surprisingly found that the use of a second bonding stage advantageously results in reduced porosity and increased density after coking, increased strength through all temperature ranges including after coking, and increased carbon after coking. All of these improvements increase the life expectancy of furnace linings made using the shaped refractory articles manufactured in accordance with the present invention, even as compared to that attainable by the cold pitch bonded shaped refractory articles without the second stage impregnation.

SUMMARY OF THE INVENTION

Broadly, the present invention relates to a process for making a shaped refractory articles comprising the steps of:

a. preparing a refractory molding mix by blending particulate refractory material with 3.0% to 8.0% by weight of a binder composition comprising:
 i. 10% to 40% by weight pitch;
 ii. 25% to 80% by weight of an aqueous solution of a water-soluble resin, which solution contains from 40% to 60% by weight of the water-soluble resin; and
 iii. 10% to 35% by weight of an organic solvent solution of a thermosetting polymer, which solution contains from 60% to 100% by weight of the thermosetting polymer;

b. shaping the refractory molding composition into a shaped refractory article; and c. impregnating the shaped article with a liquid binding impregnation medium.

In accordance with the present invention, the refractory molding composition and a method of forming the refractory molding composition into a shaped refractory article is as disclosed in application Ser. No. 413,250. According to a preferred embodiment of the shaped refractory article forming method, shaped refractory articles useful for lining basic oxygen process steel-making vessels may be prepared by coating 60 to 80 parts by weight of a coarse refractory aggregate having a particle size between 4 mesh and 28 mesh Tyler standard screen with 0.5 to 1.5 parts by weight of an organic solvent solution of a thermosetting polymer containing 60% to 100% by weight of the thermosetting polymer, to obtain a coated coarse refractory aggregate. A coated refractory aggregate-pitch admixture is obtained by adding 1.0 to 2.0 parts by weight powdered pitch and mixing with the polymer-solution-coated coarse refractory aggregate. This admixture is blended with 20 to 40 parts by weight of fine refractory aggregate having a particle size of less than 48 mesh Tyler standard screen and 2.0 to 3.0 parts by weight of an aqueous solution of a water-soluble resin containing 40% to 60% by weight of the water-soluble resin. Alternatively, the pitch may be blended with the fine refractory aggregate prior to admixing with the batch. This results in improved distribution of the pitch component. The resulting refractory molding composition is thereafter formed into a shaped refractory article. The shaped refractory article is then heated at a temperature up to about 550° F whereby the thermo-setting polymer, pitch and water-soluble resin combine to form a bonded refractory article. The resultant cold pitch bonded refractory article will have a modulus of rupture after coking in excess of 500 psi and a porosity of less than 15%.

In keeping with the concept of the present invention, the cold pitch bonded shaped refractory article is vacuum impregnated with a liquid pitch-containing binding impregnation medium to further increase the density, reduce porosity, increase strength, an increase carbon after coking. Preferably, the impregnation is effected on the shaped article heated to a temperature between 400°–600° F, with the surface temperature of the article going into the impregnating vessel preferably above 450° F. It is preferred that the liquid impregnation medium be either a hot coal tar or a hot petroleum pitch, or a combination thereof.

In accordance with the present invention, cold impregnation may also be used, such as impregnation with furfural-pitch compositions and aqueous suspensions of carbon black.

It has been found that impregnation of the shaped article with a liquid binding impregnation medium, especially a hot or cold pitch-containing medium, improves the properties as described above without bloating or cracking of the article upon subsequent heating. However, the use of an impregnation procedure as herein taught with hot pitch bonded or chemically bonded shaped articles does not provide an article which is free of bloating and cracking upon subsequent heating. Therefore, an important part of the present invention is the combination of cold pitch bonding and subsequent impregnation of the shaped article with the liquid binder impregnation medium.

DESCRIPTION OF THE PREFERRED EMBODIMENTS

The present invention may be employed to prepare shaped refractory articles, especially brick, useful as linings in basic oxygen process steel-making converters. While the process of the present invention is applicable to shapes other than brick, to facilitate understanding of the principles of the present invention, the preferred embodiments herein will be described with reference to the manufacture of brick.

As previously mentioned, it is important that brick have sufficient strength to support the charge of molten metal when used as linings in basic oxygen process steel-making converters. Such brick must have low porosity to limit erosion of the surface lining by the molten metal and slag, and the green or uncoked brick should have sufficient strength and resistance to crushing so that they may be transported, handled and placed in furnaces without breaking or spalling. The overall process of the present invention yields refractory brick having all of these properties.

The first stage binder composition used in admixture with the refractory grain prior to shaping contains from 10% to 40% by weight, and preferably from 20% to 30% by weight, pitch. The pitch employed is preferably a hard powdered pitch having a softening point of at least 250° F (more preferably at least 300° F), and a Conradson coking value of between 50% and 80% by weight. A specific coal tar pitch which is suitable has a softening point of 300°–320° F, a Conradson coking value of at least 55% by weight, a maximum of 1% by weight distillate up to 300° C and a maximum of 5% by weight distillate up to 355° C, a specific gravity of 1.30 minimum and a benzoyl insoluble content of 30% –40% by weight. The pitch is preferably employed in a finely divided form to provide good dispersion throughout the refractory mass. Typically, the pitch is employed in particle sizes such that at least 50% passes through a 200 mesh Tyler standard screen.

The first stage binder composition also comprises 25% to 80% by weight, and preferably 40% to 60% by weight, of an aqueous solution of a water-soluble resin. The aqueous solution contains from 40% to 60% by weight, and preferably from 45% to 55% by weight, of the water-soluble resin. The expression "aqueous solution of a water-soluble resin" as used herein includes both true solutions and colloidal solutions or dispersions. The water-soluble resins are preferably thermosetting.

The preferred water-soluble resins are lignosulfonates. Lignosulfonates are ammonium and metallic sulfonate salts made from the lignin of sulfite pulp mill liquors. Such compounds are readily available commercially. An acceptable lignosulfonate is marketed under the trade name Glutrin by American Can Company. Glutrin comprises a 50% solution of calcium-magnesium lignosulfonate. Other suitable lignosulfonates or lignin extracts are marketed under the trade names; Lignosite, Bindarene and Additive A. If preferred, the lignosulfonates can be used in powder form and water added.

A-stage liquid urea-formaldehyde resins form another type of suitable water-soluble resin. A suitable urea-formaldehyde resin is available under the trade name (Casco Resin CR-5H (The Borden Chemical Company).

The binder composition of the present invention further includes from 10% to 35% by weight, and preferably from 10% to 20% by weight, of water-insoluble thermosetting polymer, such as an oil-modified alkyd resin. The organic solvent solution contains from 60% to 100% by weight and preferably from 65% to 75% by weight, of the thermosetting polymer. The expression "Thermosetting polymer" as used herein encompasses thermosetting polymers per se and precursors thereof, i.e., compounds which will polymerize to thermosetting polymers.

The preferred thermosetting materials are alkyd resins. The alkyd resins useful in the present invention are sometimes referred to as oil-modified alkyds. Alkyd resins are produced by polymerizing a polyhydric alcohol, a polybasic acid, and monobasic fatty acids. The fatty acid content of the alkyd is commonly supplied in the form of a triglyceride or oil.

Polybasic acids commonly employed to prepared alkyds include phthalic anhydride, isophthalic acid, maleic anhydride, fumaric acid, azelaic acid, succinic acid, adipic acid and sebacic acid. Common polyhydric acids include glycerol, pentaerythritol, dipentaerythritol, trimethylolethane 2-(hydroxymethyl)-2-methyl-1, 3-propanediol, sorbitol, ethylene glycol, propylene glycol, dipropylene glycol, trimethyolpropane, 2-ethyl-2-(hydroxymethyl)-1, 3-propanediol, neopentylene glycol, 2,2-dimethyl-1, 3-propanediol), etc. The most commonly employed polyhydric alcohols are pentaerythritol and glycerol, while the most commonly employed acid is phthalic anhydride.

The most commonly employed oils include linseed, soya, tall, dehydrated castor, fish, safflower, oticia, cottonseed and coconut. Soya and linseed oils are preferred with respect to the alkyds useful in the present invention.

Alkyd resins are generally employed as solutions in organic solvents. The most common solvent is mineral spirits, although other hydrocarbons, including aromatic hydrocarbons such as xylene, may also be employed.

The alkyds are preferably long oil alkyds and contain an oil content of greater than 60% by weight and a phthalic anhydride content of from 16% to 20%. Odorless mineral spirits are used as a solvent and may be added up to 40% depending upon the particular alkyd used and the viscosity desired.

A specific alkyd resin which has been found to be suitable in the present invention is available under the trade name Aroplaz 1271-M-70 (Ashland Oil Company). This alkyd, when diluted with 30% odorless mineral spirits, has a viscosity of about 40 cps at 25° C. Aroplaz 1271 is a long oil, linseed alkyd containing 77% linseed oil and 16% phthalic anhydride.

A wide variety of organic solvents may be employed with the thermosetting materials. The exact nature of the organic solvent employed with depend to some extent upon the particular thermosetting material used. For example, when alkyd resins are employed, mineral spirits are preferred. The solvent employed should be a solvent for both the pitch and the resin.

A refractory molding composition suitable for use in making shaped refractory articles can be obtained by including from 92% to 97% by weight of a particular refractory material with from 3% to 8% by weight of the binder composition. A preferred molding composition comprises 94% to 96% by weight of particular refractory material and from 4.0% to 6.0% by weight of the binder composition. Such compositions may readily be formed into shaped refractory articles which possess good green strength after drying and a high strength and low porosity after coking.

Conventional refractory materials are suitable, including dead burned magnesite, periclase, chrome ore, sintered alumina aggregates, calcined bauxite, fused or sintered magnesite chrome grains, silica clays, dead burned dolomite, and the like. Dead burned magnesite or periclase are preferred for basic oxygen furnace applications.

In the refractory molding compositions, well known, commonly used grain sizes of refractory material may be employed. However, to obtain low porosity refractory articles useful in basic oxygen process furnaces, the sizes of the refractory aggregates should be selected to achieve maximum bulk density and low porosity. Techniques of selecting grain size to accomplish this end, by employing combinations of relatively coarse and relatively fine refractory aggregates, are well known in the art. As an example, 60 to 80 parts by weight of a coarse refractory aggregate having a particle size between 4 mesh and 28 mesh Tyler standard screen may be used in combination with 20 to 40 parts by weight of a fine refractory aggregate having a particle size of less than 48 mesh Tyler standard screen. A typical screen analysis suitable to achieve high bulk density and low porosity, using Tyler standard screen sizes, is as follows:

35% passing 4 mesh and retained on 8 mesh
35% passing 8 mesh and retained on 28 mesh
30% ball mill fines (70% passing 325 mesh)

The refractory molding compositions used in the present invention may also contain from 1.0% to 4.0% by weight carbon black. Preferably, a medium thermal grade carbon black is added to the refractory composition to increase residual carbon content after coking.

In accordance with the preferred method of preparing shaped brick 60 to 80 parts by weight, and preferably 65 to 75 parts by weight, of a coarse refractory aggregate is first coated with .5 to 3 parts by weight, and preferably 0.5 to 1.5 parts by weight, of an organic solvent solution of a thermosetting polymer. The organic solvent solution of a thermosetting polymer should contain 60% to 100% by weight of the thermosetting polymer. The coarse refractory aggregate may have a particle size between 4 mesh and 48 mesh, and preferably between 4 mesh and 28 mesh, Tyler standard screen. Powdered pitch in the amount of 1 to 5 parts by weight and preferably 2 to 4 parts by weight and, if desired, 1 to 4 parts medium thermal grade carbon black are blended with from 20 to 40 parts by weight, and preferably 25 to 35 parts by weight, of a fine refractory aggregate having a particle size of less than 48 mesh and preferably 70% less than 325 mesh Tyler standard screen. The preblended pitch, carbon black and fine refractory aggregate are then blended with the coated coarse refractory aggregate. An aqueous solution of a water-soluble resin in the amount of 1 to 3 parts by weight and preferably 1 to 2 parts by weight is then added. The aqueous resin solution may contain 40% to 60% by weight of the resin.

In accordance with the invention, the resultant refractory molding composition is pressed into brick at room temperature. The brick is heated to from 200° F to 1,000° F, preferably from about 250° F to 600° F, under conditions whereby the thermosetting material, the pitch, and the water-soluble binder react to form a bonded refractory brick. As embodied herein, the shaped brick may be heated continuously from room temperature, or first dried at a temperature from 200° F to 350° F, preferably about 270° F to 300° F, and subsequently heated to a temperature from 500° F to 1,000° F, preferably 550° F to 560° F, to cause the binder materials to react.

The cold pitch bonded brick, after coking at 1,800° F for five hours, will have a modulus of rupture after coking in excess of 500 psi and a porosity of less than 15%. In accordance with the present invention, the properties are further improved by impregnating the brick with a liquid binding impregnation medium, preferably a pitch-containing liquid. Impregnation is preferably effected in a heated impregnation vessel with a vacuum maintained on the brick. The impregnation vessel, such as an autoclave, is maintained at a temperature at least about 450° F, and preferably above 450° F up to about 600° F.

The brick is placed in the impregnating vessel with a brick surface temperature of at least about 450° F, and preferably above 450° F up to about 600° F. Higher temperatures may be used. In accordance with the invention as embodied herein, it is especially advantageous to place the brick in the impregnating vessel while still hot from the prior heating stage during which the binder materials are caused to react. Thus, the brick is preferably heated to a temperature in the range of 200° to 1,000° F, preferably from about 550° F to 560° F, and while still at that temperature, placed in the impregnating vessel.

During impregnation, a vacuum is maintained on the brick for at least about six minutes prior to the introduction of the liquid binding impregnation medium into the vessel. A vacuum of about 25 inches of mercury is a suitable vacuum to maintain on the brick.

The liquid binding impregnation medium is introduced into the vessel after the brick has been maintained under vacuum for at least about six minutes, and the impregnation medium is subjected to a pressure, for example, of about 80–85 psi, for at least about 5 minutes.

In general, the conditions utilized during impregnation are not critical per se; the important consideration is that a technique and suitable conditions be employed which will result in thorough impregnation of the brick with the liquid binding impregnation medium. Thus, conventional impregnation methods and conventional conditions for vacuum impregnation are suitable in the practice of the present invention to cause a thorough impregnation of the brick with the impregnation medium.

After the impregnation step is completed, the bricks are removed from the impregnating vessel and cooled. For example, air cooling is sufficient.

The liquid bonding impregnation medium is preferably selected from the group consisting of a coal tar pitch, a petroleum pitch, and mixtures thereof. A suitable coal tar pitch for use in the practice of the present invention has the following properties:

| | |
|---|---|
| Softening Point R/B (A.S.T.M. D-36) | 84–91° C |
| C/A (A.S.T.M. D-2319) | 88–95° C |
| Distillation to 355° C (A.S.T.M. D-20) | 5% Max. |
| Quinoline Insoluble (A.S.T.M. D-2318) | 5% Max. |
| Insoluble in Toluene-Benzene (A.S.T.M. D-2317) | 10–25% |
| Coking Value, Conradson (A.S.T.M. D-2416) | 35% Min. |
| Ash (A.S.T.M. D-271) | 0.5% Max. |

A suitable petroleum pitch for use in the practice of the present invention has the following properties:

| | |
|---|---|
| Softening Point R/B (A.S.T.M. D-36) | 120–127° C |
| Quinoline Insoluble (A.S.T.M. D-2318) | 0–0.3% |
| Insoluble in Toluene-Benzene (A.S.T.M. D-2317) | 7–11% |
| Coking Value, Conradson (A.S.T.M. D-2416) | 50% Min. |
| Ash (A.S.T.M. D-271) | 0.2% Max. |

The pitch is preferably heated to a flowable condition and introduced into the impregnation vessel under pressure.

It is also within the contemplation of the present invention that the pitch be introduced in the cold using a liquid solvating medium. Any solvent for the pitch may be used. Preferably, the solvent is furfural. The pitch may suitably comprise from about 60% to about 80%, preferably from 65% to 75%, by weight. For example, a room temperature solution of about 70% pitch with 30% furfural may be used in the practice of the present invention.

Impregnation with aqueous dispersions of carbon black as presently available on the market is also contemplated within the spirit of this invention.

The mechanism by which the coked strength increases so dramatically upon impregnation is not known. However, significant improvements in properties can be expected utilizing the overall process, including second stage impregnation, according to the present invention. Thus, a range of properties that may be expected after the brick are impregnated include the following:

| | |
|---|---|
| Bulk Density After Impregnation | 1.75–1.80 oz/in³ |
| After Coking Test | 1.72–1.76 oz/in³ |
| Porosity After Coking Test | 9–12% |
| Porosity After Ignition | 13–17% |
| Retained Carbon After Coking | 4–5% |
| Modulus of Rupture | |
| Impregnated | 1500–2500 psi |

| -continued | |
|---|---|
| After Coking Test | 600–1200 psi |

What is claimed is:

1. A method for making a shaped refractory article comprising the steps of:
   a. preparing a refractory molding mix by blending particulate refractory material with 3.0% to 8.0% by weight of a binder composition comprising:
      i. 10% to 40% by weight pitch;
      ii. 25% to 80% by weight of an aqueous solution of a water-soluble resin, which solution contains from 40% to 60% by weight of the watersoluble resin; and
      iii. 10% to 35% by weight of an organic solvent solution of a thermosetting polymer, which solution contains from 60% to 100% by weight of the thermosetting polymer;
   b. shaping the refractory molding composition into a shaped refractory article at room temperature;
   c. heating the shaped article to a temperature in the range of from about 200° F to about 1,000° F to form a cold pitch bonded shaped article; and (d) impregnating the cold pitch bonded shaped article under vacuum with a liquid impregnation medium containing a material selected from the group consisting of coal tar pitch, petroleum pitch, and mixtures thereof.

2. A method according to claim 1 in which the shaped refractory article has a surface temperature of at least about 450° F at the time of the impregnating step.

3. A method for making a shaped refractory article comprising the steps of:
   a. preparing a refractory molding mix by blending 92% to 97% by weight of a particular refractory material with 3.0% to 8.0% by weight of a binder composition comprising:
      i. 10% to 40% by weight pitch;
      ii. 25% to 80% by weight of an aqueous solution containing from 40% to 60% by weight of ammonium or metal lignosulfonate or a urea-formaldehyde resin; and
      iii. 10% to 35% by weight of an organic solvent solution containing 60% to 100% of an alkyd resin;
   b. shaping the refractory molding composition into a shaped refractory article at room temperature;
   c. heating the shaped refractory article to a temperature in the range of from 200° F to 1000° F to form a cold pitch bonded shaped article;
   d. placing the heated shaped refractory article under vacuum for at least about 6 minutes; and
   e. impregnating the heated shaped refractory article under vacuum for at least about 5 minutes with a liquid binding impregnation medium comprising pitch under pressure.

4. A method according to claim 3 in which the impregnation medium is selected from the group consisting of coal tar pitch having the following properties:

| | |
|---|---|
| Softening Point R/B (A.S.T.M. D-36) | 84–91° C |
| C/A (A.S.T.M. D-2319) | 88–95° C |
| Distillation to 355° C (A.S.T.M. D-20) | 5% Max. |
| Quinoline Insoluble (A.S.T.M. D-2318) | 5% Max. |
| Insoluble in Toluene-Benzene (A.S.T.M. D-2317) | 10–25% |
| Coking Value, Conradson (A.S.T.M. D-2416) | 35% Min. |
| Ash (A.S.T.M. D-271) | 0.5% Max., |

-continued petroleum pitch having the following properties:

| | |
|---|---|
| Softening Point R/B (A.S.T.M. D-36) | 120–127° C |
| Quinoline Insoluble (A.S.T.M. D-2318) | 0–0.3% |
| Insoluble in Toluene-Benzene (A.S.T.M. D-2317) | 7–11% |
| Coking Value, Conradson (A.S.T.M. D-2416) | 50% Min. |
| Ash (A.S.T.M. D-271) | 0.2% Max., | and mixtures thereof.

5. A method according to claim 3 in which the impregnation medium is heated to a flowable condition prior to impregnation.

6. A method according to claim 3 in which the shaped refractory article is brick.

7. A method according to claim 1 in which the water-soluble resin is an ammonium or metal lignosulfonate or a ureaformaldehyde resin and the thermosetting polymer is an alkyd resin.

8. A method according to claim 1 in which the shaped article is heated to a temperature in the range of from about 250° F to about 600° F.

* * * * *